United States Patent [19]

Malik et al.

[11] Patent Number: 5,852,657

[45] Date of Patent: Dec. 22, 1998

[54] METHOD FOR VISUAL DELIVERY TO A CALLER OF SELECTED INFORMATION ASSOCIATED WITH A TELEPHONE NUMBER IN AN ADVANCED INTELLIGENT NETWORK VIA PUBLIC SWITCH TELEPHONE NETWORK

[75] Inventors: Dale W. Malik, Atlanta; Stephen Randolph La Pierre, Union City; Robert A. Koch, Norcross; Alexander David Raji, Atlanta, all of Ga.

[73] Assignee: BellSouth Corporation, Atlanta, Ga.

[21] Appl. No.: 877,863

[22] Filed: Jun. 18, 1997

[51] Int. Cl.$^6$ .................................................. H04M 11/00
[52] U.S. Cl. ..................................... 379/93.25; 379/93.23; 379/201
[58] Field of Search ............................. 379/93.01, 93.08, 379/93.09, 93.14, 93.17, 93.18, 93.23–93.28, 93.35, 201, 215, 142, 100.11

[56] References Cited

U.S. PATENT DOCUMENTS

| | | | |
|---|---|---|---|
| 5,263,084 | 11/1993 | Chaput et al. | 379/142 |
| 5,416,831 | 5/1995 | Chewning, III et al. | 379/93.25 |
| 5,577,108 | 11/1996 | Mankovitz | 379/93.26 |
| 5,657,378 | 8/1997 | Haddock et al. | 379/93.23 |

*Primary Examiner*—Wing F. Chan
*Attorney, Agent, or Firm*—Jones & Askew, LLP

[57] ABSTRACT

A method for a telecommunication subscriber to obtain information associated with another telecommunication subscriber using telecommunications terminating equipment with data receipt and visual display capability, such as an analog display service interface compatible telephone, and an advanced intelligent network (AIN), accessible through a public switch telephone network (PSTN). In the method, a caller sends a first communication to the PSTN including an information retrieval service number. In response to receiving the first communication, the AIN, through the PSTN, sends a message to the caller prompting the caller to communicate a subject telephone number. The caller, in response sends a second communication including the subject telephone number. In response to receiving the second communication, the selected data is retrieved from a database and then sent by the PSTN to the caller's telecommunications terminating equipment in a response message for visual display of the data.

27 Claims, 5 Drawing Sheets

FIG. 7 the present invention can be better understood by reference to the detailed description and drawing.

METHOD FOR VISUAL DELIVERY TO A CALLER OF SELECTED INFORMATION ASSOCIATED WITH A TELEPHONE NUMBER IN AN ADVANCED INTELLIGENT NETWORK VIA PUBLIC SWITCH TELEPHONE NETWORK

TECHNICAL FIELD

The present invention relates to telecommunications systems and, more particularly, to a method for providing information in an Advanced Intelligent Network (AIN) to a caller.

BACKGROUND OF THE INVENTION

Modem telephone systems are operated by sophisticated computer networks such as the Advanced Intelligent Network (AIN) architecture operated by BellSouth Telecommunications of Atlanta, Ga. This AIN system provides numerous services to the customer in a fast, efficient, and largely transparent manner.

The AIN operates in conjunction with a public switch telephone network or PSTN, which is a conventional telephone network. The PSTN performs conventional telephone services such as connecting a calling party to a called party to complete a telephone call. In addition, the PSTN provides access for telephone service subscribers to the AIN. The AIN is programmable and provides services such as Caller ID-Deluxe, available from BellSouth Telecommunications of Atlanta, Georgia.

Caller ID-Deluxe is an enhancement of Caller ID. Caller ID provides a called party with the telephone number of the calling party and does not require the AIN. Caller ID-Deluxe, however, uses the AIN to retrieve and provide the calling party's name in addition to the calling party's number.

Information associated with a telecommunication subscriber other than calling party name and number is often desired to be known. Such additional information includes zip code, facsimile machine number, and the like. Although such information is available to telecommunications subscribers through various directories and databases, it is not normally easily and quickly available. It is often necessary to contact the telecommunication subscriber directly to obtain such information. In addition, it is often desirable to obtain information associated with a telecommunication subscriber even when that telecommunication subscriber is not calling you. Caller ID and Caller ID-Deluxe only provide calling party name and number when the calling party happens to call you.

Therefore, there is a need for telecommunication subscribers to easily and quickly obtain information, such as zip code and facsimile number, associated with another telecommunication subscriber.

SUMMARY OF THE INVENTION

Generally described, the present invention encompasses a method for retrieving and visually displaying information associated with a particular telephone number. The method of the present invention uses an Advanced Intelligent Network to retrieve information associated with a particular telephone number and telecommunications terminating equipment with data receipt and visual display capability to display the retrieved information for the caller. Accordingly, this method allows one telecommunication subscriber to easily and quickly obtain information or data associated with another telecommunication subscriber using telecommunication terminating equipment, such as a telephone. This information can be obtained without actually contacting the telecommunication subscriber. A particularly advantageous feature of this invention is that it allows the caller requesting the information to receive the information at the telecommunications terminating device used to make the request or at another telecommunications terminating device of the caller's choosing.

More particularly, the method of the present invention is a method for delivering selected data associated with a telephone number in an advanced intelligent network via a public switch telephone network to telecommunication terminating equipment with data receipt and visual display capability. The method is initiated by a caller dialing a special information retrieval service number. This call is a first communication from the caller which is received by the public switch telephone network. In response to this first communication, an announcement is sent to the caller prompting the caller to communicate a subject telephone number. The caller dials the subject telephone number thereby launching a second communication. Upon receiving the second communication from the caller including the subject telephone number, a service control point in the advanced intelligent network retrieves the selected data associated with the subject telephone number from a database and creates a new communication for delivery in a response message through the public switch telephone network to telecommunications terminating equipment associated with the caller and capable of calling name display. The telecommunications terminating equipment has data receipt and visual display capability for visual display of the data. Examples of data which can be selected include zip codes and facsimile machine numbers.

In addition, according to an embodiment of the present invention, the method can include sending an announcement to the caller prompting the caller to select a telephone number corresponding to the telecommunications terminating equipment at which the data is to be received. This allows the caller to receive the selected data at terminating equipment other than the equipment used to make the information retrieval service request. This is useful when the call is made from a telephone which is not capable of visually displaying the information.

Suitable telecommunication terminating equipment for use with the method of the present invention includes analog display service interface capable telephones, particularly those with caller ID on call waiting capability. Alternatively, the terminating equipment can be a personal computer or a telephone with a separate caller ID display.

More particularly, the method of the present invention can also include the step of sending an announcement to the caller prompting the caller to communicate a selection of data to be retrieved. For example, the caller could select either a zip code or a facsimile machine number.

According to still another embodiment of the present invention, the method can include automatically retrieving and sending, in series, a plurality of response messages containing information associated with a plurality of respective subject telephone numbers in response to a single request for data. In such an embodiment, the AIN automatically makes the necessary series of calls to the requesting caller to send the plurality of response messages.

Accordingly, an object of the present invention is to provide a method for a telecommunication subscriber to easily and quickly obtain information associated with another telecommunication subscriber.

Another object of the present invention is to provide a method for visual delivery of information associated with one or more telecommunication subscribers to another.

Still another object of the present invention is to provide a method for retrieval and delivery of information associated with one telecommunication subscriber to another without having to contact the telecommunications subscriber with which the desired information is associated.

Yet another object of the present invention is to provide a method for retrieval and visual delivery of information associated with a particular telephone number such as a zip code or a facsimile machine number.

Other objects, features, and advantages of the present invention will become apparent upon review of the following detailed description of embodiments of the invention, taken in conjunction with the accompanying drawings and claims.

DETAILED DESCRIPTION OF THE INVENTION

Figure 1:
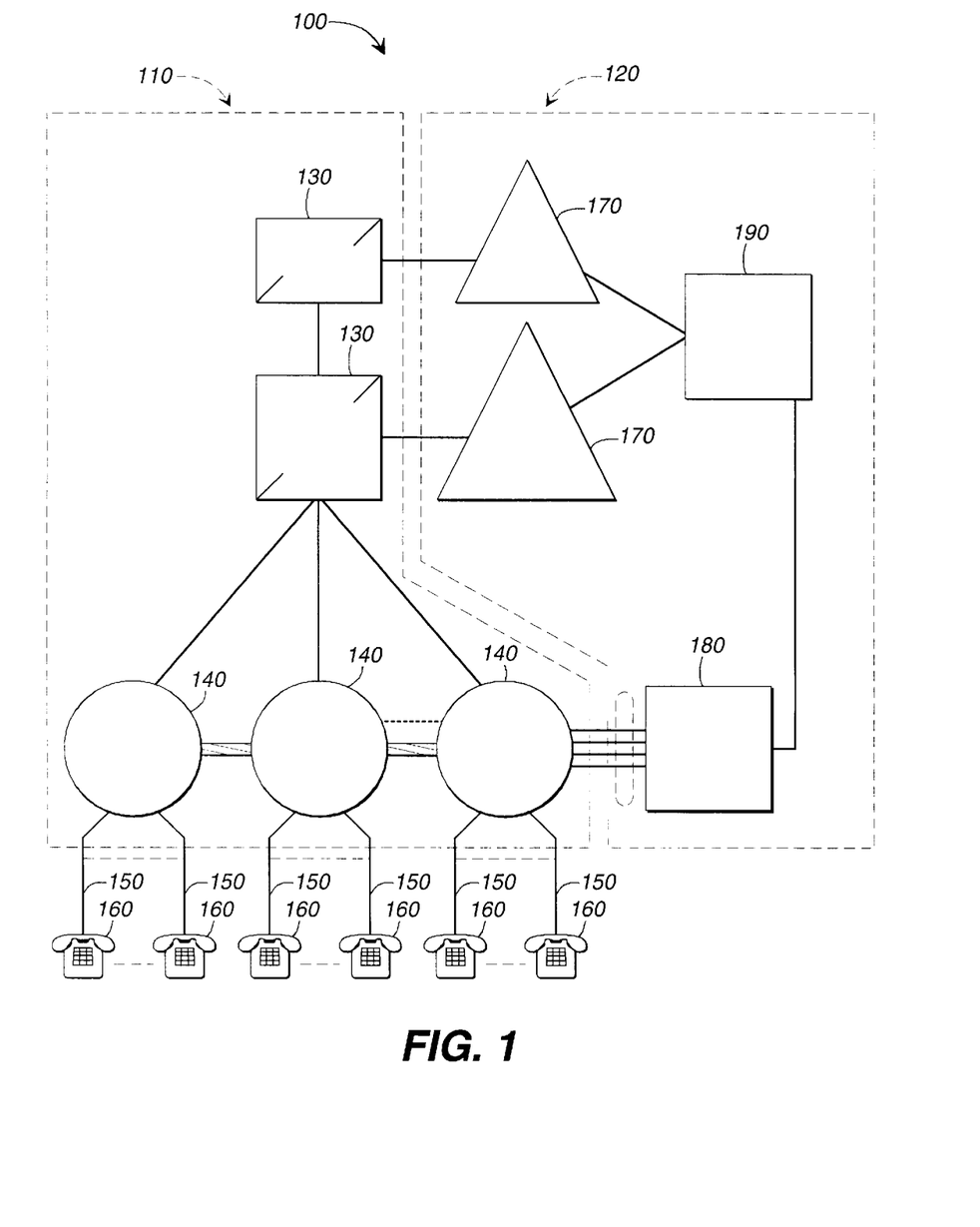
FIG. 1 is a block diagram of the elements of an AIN system.

As summarized above, this invention encompasses a method for a telecommunications subscriber to obtain information associated with another telecommunications subscriber using telecommunications terminating equipment with data receipt and visual display capability, such as an analog display service interface ("ADSI") compatible telephone, and an advanced intelligent network ("AIN"), accessible through a public switch telephone network ("PSTN"). Below, a telecommunications system 100 for carrying out embodiments of the present invention is described in detail followed by a description of methods for using the system. Referring to the drawings, in which like numerals indicate like elements throughout the several figures, FIG. 1 shows the elements of the telecommunications system 100. Generally described, the telecommunications system 100 includes a PSTN 110 and an AIN 120.

The PSTN 110 is a conventional telephone network comprising multiple signaling transfer points 130 which are connected to multiple service switching points 140. The signaling transfer point 130 is a packet switch that routes communications from one node to another, particularly from an originating node to a destination node. Signaling transfer points 130 are generally deployed in pairs ("a tandem office") and can operate on both a local and a regional level. The service switching points 140 are conventional end offices or central offices with the ability to communicate with the AIN system 120. The preferred service switching points 140 include the Lucent Technologies 5ESS, the NTI DMS100, Siemens Stromberg and Carlson EWSD and DCO. Desirably, the service switching point 140 is equipped with AIN software release 0.1, 0.2, or a higher release. For more information, see BellCore Specification TR-NWT-001284 Switching Systems Technical Requirements for AIN 0.1, which is incorporated herein by reference.

A plurality of subscriber lines 150 are connected to each service switching point 140 and each subscriber line is connected to a piece of telecommunications terminating equipment such as an ADSI compatible telephone 160. An ADSI telephone can also be described as a BellCore specified Type III CPE unit which is capable of operating with caller ID on call waiting service. Although the ADSI compatible telephones 160 are illustrated as the pieces of terminating equipment in FIG. 1, those skilled in the art will understand that such pieces include other telecommunication units or devices such as BellCore specified Type II CPE units, computers, modems, and the like. A BellCore specified Type II CPE unit is a display unit which is capable of adapting a non-ADSI telephone for use with caller ID on call waiting service. ADSI telephones are described in commonly-owned U.S. Pat. No. 5,416,831, to Chewning, III et al., the disclosure of which is expressly incorporated herein by reference.

The AIN 120 operates in conjunction with the PSTN 110. The AIN 120 includes a service control point 170, a service circuit node 180, and a service management system 190. The operation of an AIN 120 with respect to the PSTN 110 is described in detail in commonly owned U.S. Pat. No. 5,416,831 to Chewning, III et al., already incorporated herein by reference.

The service control point 170 is the platform upon which the AIN 120 service packages are installed. The service control point 170 can be viewed as a network server with a database. The service control points 170 operate on both a local and regional level. The preferred service control point 170 is provided by Lucent Technologies under the name "A-I-Net." The service circuit node 180 is preferably the BellSouth services node. High level call processing routines are performed on the service circuit node 180. The routines are generally written in the Service Logic Language (SLL) supplied by Lucent Technologies, Naperville, Ill. Service circuit nodes, such as the BellSouth services node, are also available from Lucent Technologies. The service circuit node 180 is controlled by the service management system 190. The service management system 190 is an AIN operation system designed to facilitate database management, including software updates, service data updates, subscriber data updates and subscriber service reports. The AIN 120 elements are connected by data links through the Common Channel Signal System 7 ("CCS7") network.

Figure 2:
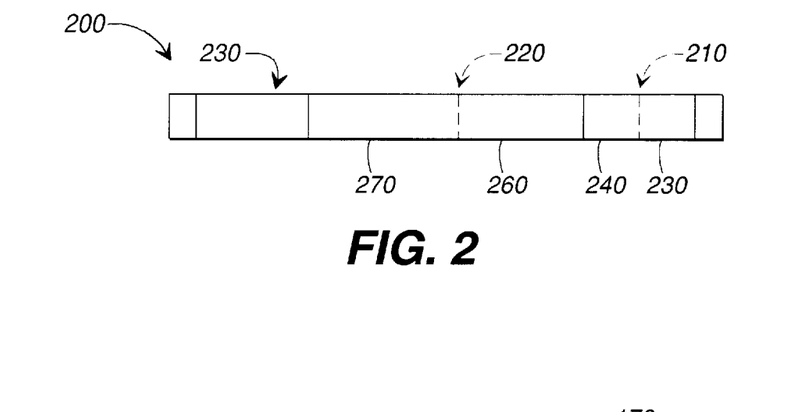
FIG. 2 shows the standard Common Channel Signal System 7 network address message.

Messages including telephone calls, requests for services, and responses to those requests in the telecommunications system 100 are routed through the use of a standardized CCS7 address format. FIG. 2 shows a standard CCS7 address message 200. The CCS7 address message 200 is used for both non-AIN routing and for requesting and delivering AIN services. "Message" will be used throughout this description to refer to telephone calls, AIN service requests, also called queries, and responses to AIN service requests. The CCS7 message 200 comprises three parts: the message transfer part or routing label 210, the signaling connection control part 220, and the data field 230. In a query message to the AIN, the data field 230 is referred to as the Transaction Capability Application Part ("TCAP").

The routing label 210 comprises the point codes for the originating and destination service switching points 140, the originating point code 240 and the destination point code 250. Each point code is in the format NNN CCC XXX in which NNN is a network identifier, CCC is a cluster identifier for each pair of signaling transfer points 130, and XXX is the node identifier for each service switching point 140 or end office or a capability code for the signaling transfer point 130. The signaling connection control part 220 of the address message 200 comprises the called party address or the global title 260 and the calling party address 270 with the subsystem number or the identifier of the appropriate AIN service. The data field or TCAP 230 comprises data for the AIN services and the particular telephone call.

Figure 3:
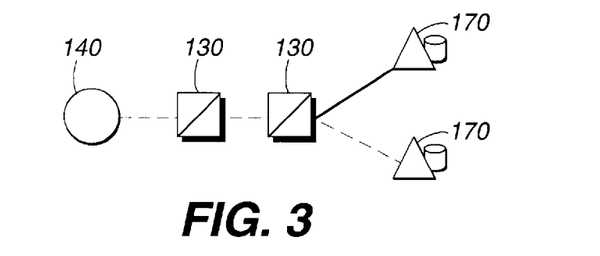
FIG. 3 is a block diagram illustrating AIN message routing.

FIG. 3 illustrates AIN query message routing for example. When the service switching point 140 detects a trigger, the service switching point launches an AIN query message 200 with appropriate information to the signal transfer point 130. The service switching point 140 populates the routing parameters of the query message 200 as follows: the originating point code 240 contains the point code for the service switching point 140, the destination point code 250 contains the capability code for local signaling transfer point 130, the called party address 260 contains the ten (10) digit dialed number, the calling party address 270 contains the calling line (caller) number and other call data such as the point code for the service switching point 140 and the subsystem number for the appropriate AIN service. Finally, the data field 230 contains a transaction ID for the call.

At the signaling transfer point 130, the query message 200 is translated before being routed to the appropriate service control point 170. The signaling transfer point 130 changes the destination point code 250 from the capability code of the signaling transfer point to the point code of the appropriate service control point 170. The query message 200 is then routed to the service control point 170 for processing. The service control point 170, with access to the service circuit node 180 as needed, processes the query message 200 and places a response message in the data field part 230 of the message. The response message 200 will instruct the service switching point 140 to perform the required activity, such as to play a particular message or to collect DTMF digits, such as for a Personal Identification Number ("PIN") to use a particular service. The service control point 170 routes the response message 200 back to the service switching point 140 by populating the message transfer part 210 with the originating point code 240 of the service control point and the destination point code 250 of the service switching point. The called party address 260 contains the subsystem number of the service switching point 140 and the calling party address 270 contains the subsystem number of the service control point 170. Multiple query messages and response messages, also known as transactions or conversations, may be performed in the operation of any given AIN service.

Figure 4:
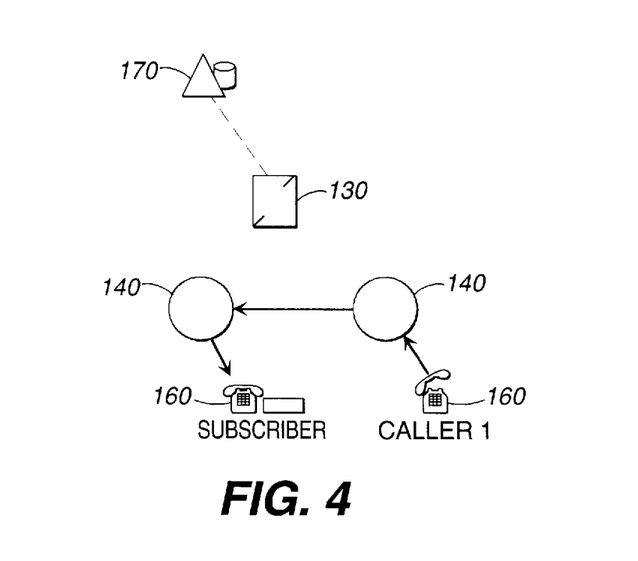
FIG. 4 is a block diagram illustrating the operation of a "Caller ID-Deluxe" system.

A typical example of an AIN service is shown in FIG. 4 in which the operation of a "Caller ID-Deluxe" call is shown. Caller ID-Deluxe is available from BellSouth Telecommunications of Atlanta, Ga. Although typical Caller-ID services are not AIN-based, i.e., the calling party's service switching point 140 simply forwards the caller's number in the calling party address 270 of the message 200, the caller's name is also displayed in the Caller ID-Deluxe service. This service is AIN-based and requires a database look-up to determine the caller's name. A Caller ID-Deluxe subscriber has a display unit or uses an ADSI compatible telephone to display the caller's name and number along with the date and time of the call. Alternatively, the subscriber can use a computer to display or store this information.

In operation, the Calling Party's number is captured by the Calling Party's service switching point 140 and sent to the Called Party's service switching point in the address message 200. The Called Party's service switching point 140 recognizes that the call is for a Caller ID-Deluxe subscriber and launches an AIN query message 200 to the local signaling transfer point 130. The query message 200 contains the Calling Party's number in the called party address part 260. The signaling transfer point 130 performs the translation on the Called Party address to determine the appropriate service control point 170 to route the query message 200. The service control point 170 then searches its database for the calling number record corresponding to the Calling Party's number. The service control point 170 retrieves the associated name and returns the name in the data field 230 of the response message to the service switching point 140. The service switching point 140 then completes the call with the Calling Party's name, number, date and time.

Embodiment 1: Information Delivery to the Telephone of the Caller Used in Making the Request The present invention takes advantage of the caller-ID display, an ADSI telephone, a facsimile machine, or a computer to display data and parameters beyond the caller's name and number. In response to an appropriate trigger, a service control point 170 can forward the desired data in the place of the caller ID number and name. In particular, a useful aspect of the present invention is that it allows the initial caller to request and receive the desired data, unlike caller-ID on call waiting which displays data only for the called party.

Figure 5:
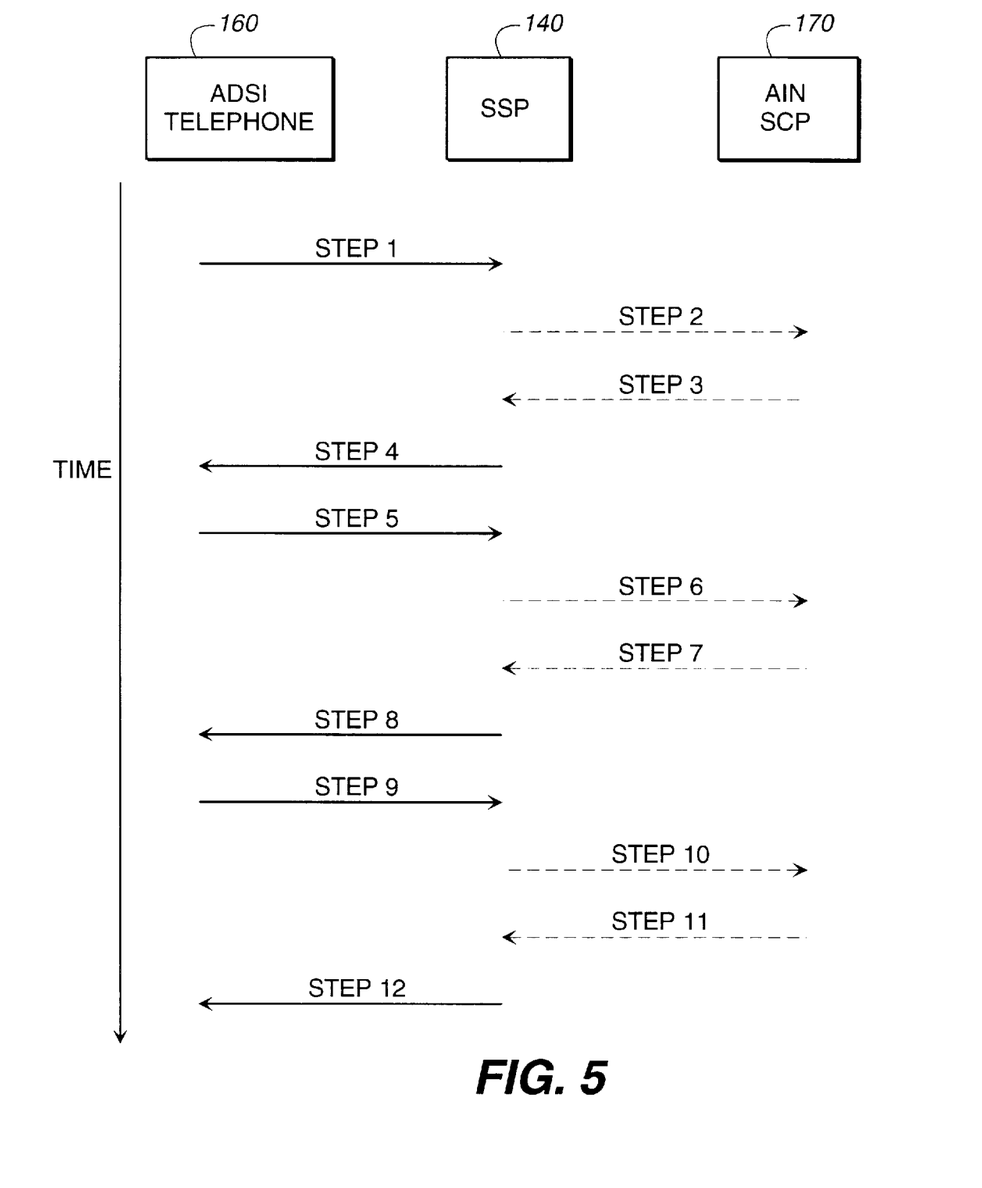
FIG. 5 is a time-line diagram illustrating the operation of an AIN data retrieval and visual display service with a caller ID on call waiting function, in accordance with a first embodiment of this invention.

The method of the present invention, according to a desired embodiment, takes advantage of the data retrieval capability of the AIN and an ADSI telephone, a caller-ID display, or a computer to retrieve and display, for the caller, selected data associated with a subject telephone number. FIG. 5 illustrates the steps of a method for data retrieval and display, in accordance with an embodiment of the present invention. Desirably, the service switching point 140 is programmed with BellCore specification TR-NWT-00575 for caller-ID on call waiting, which specification is incorporated herein by reference.

In FIG. 5 illustrating a first embodiment of the present invention, the solid line arrows on the diagram represent the phone paths and the broken line arrows represent data signaling. In step 1, the Caller, whose telephone number is 404-555-1234, initiates a first communication by dialing an information retrieval service number, 404-555-INFO, to access the information retrieval service provided by the AIN 120 via the service switching point 140. Caller A makes this first communication from the ADSI telephone 160, and the service switching point 140 receives the first communication, which includes the information retrieval service number. The information retrieval service number has a termination attempt trigger assigned to it in the service switching point 140. The termination attempt trigger causes an AIN query message to be sent for all calls originating from any caller and dialed to 404-555-INFO. Thus, in step 2, the service switching point 140 recognizes the 404-555-INFO number as having an AIN termination attempt trigger assigned to it. In response to the trigger, the service switching point 140 launches a first query message to the AIN service control point (AIN SCP) 170 through the appropriate signal transfer point 130. In this step 2, the calling party address 270 is the telephone number of Caller A, 404-555-1234, and the data field 230 is populated with a request for information retrieval service.

In response to the AIN SCP 170 receiving the first query message, the AIN SCP, which stores the call processing logic for the information retrieval service, conducts step 3 which includes sending a first response message to the service switching point 140 to send a first announcement to Caller A prompting Caller A to communicate a subject telephone number. Specifically, the AIN SCP 170 sends the first response message to a service switching point 140. In step 4, the service switching point 140 sends the first announcement to Caller A prompting the caller to communicate the subject telephone number. Then, in Step 5, the caller enters the subject telephone number, 704-555-0000, with the keypad of the ADSI telephone 160, and thereby sends a second communication to the service switching point 140. The service switching point 140 receives the second communication from Caller A including the subject telephone number, and in step 6, sends the subject telephone number in a second query message via the appropriate signal transfer point 130 to the AIN SCP 170.

In response to receiving the second query message from the service switching point 140, the AIN SCP 170, in step 7, sends a second response message to the service switching point to send a second announcement to Caller A prompting Caller A to communicate a selection of data to be retrieved. The second announcement, for example, could be as follows: "Press 1 for the fax number, press 2 for the zip code . . . ". The data to be retrieved is associated with the subject telephone number. The service switching point 140 receives the second response message, and in step 8, sends the second announcement to Caller A prompting Caller A to communicate the selection of data to be retrieved. In step 9, Caller A then enters the selection of data to be retrieved using the phone 160 keypad and thereby sends a third communication to the service switching point 140. The third communication from Caller A includes the selection of data to be retrieved. In step 10, the service switching point 140 sends the third communication in a third query message via the appropriate signal transfer point to the AIN SCP 170. In response to receiving the third query message from the service switching point 140, the AIN SCP 170, in step 11, searches its database to find the subject telephone number and its associated data. This information might be stored in a table as follows:

TABLE 1

| SUBJECT TN | FAX NUMBER | ZIP CODE |
|---|---|---|
| 7045550000 | 7045559876 | 28804*1234 |

The AIN SCP 170 determines the value of the data selected by Caller A, retrieves the data, and loads it in the calling party address of a third response message and sends the third response message to the service switching point 140. For example, if Caller A selected the fax number as the desired data, then the third response message from the AIN SCP 170 would have the calling party address 270 populated with the number 704-555-9876 and the called party address 260 populated with Caller A's telephone number 404-555-1234.

The service switching point 140 receives the third response message from the AIN SCP 170 in step 11 and, in step 12, routes the call to Caller A's telephone 160. The call from the service switching point 140 appears as a second incoming call via call waiting on the phone and is displayed to Caller A in the caller ID display of the phone. In other words, the data requested by the initial Caller A is sent to the initial Caller A and unloaded at Caller A's telephone for display.

It should be understood that for a nine digit zip code to be displayed for the caller, the zip code would have to be padded to a length of ten digits such as by inserting a delimiter in between the first five and the last four digits of the zip code. Possible delimiter characters include "*" "#" and "0".

Furthermore, although the information to be retrieved is described herein as a facsimile machine number or a zip code, it should be understood that other data associated with a subject telephone number can be stored in the AIN database and retrieved with the method of the present invention.

Embodiment 2: Information Delivery to an Alternate Delivery Number

Figure 6:
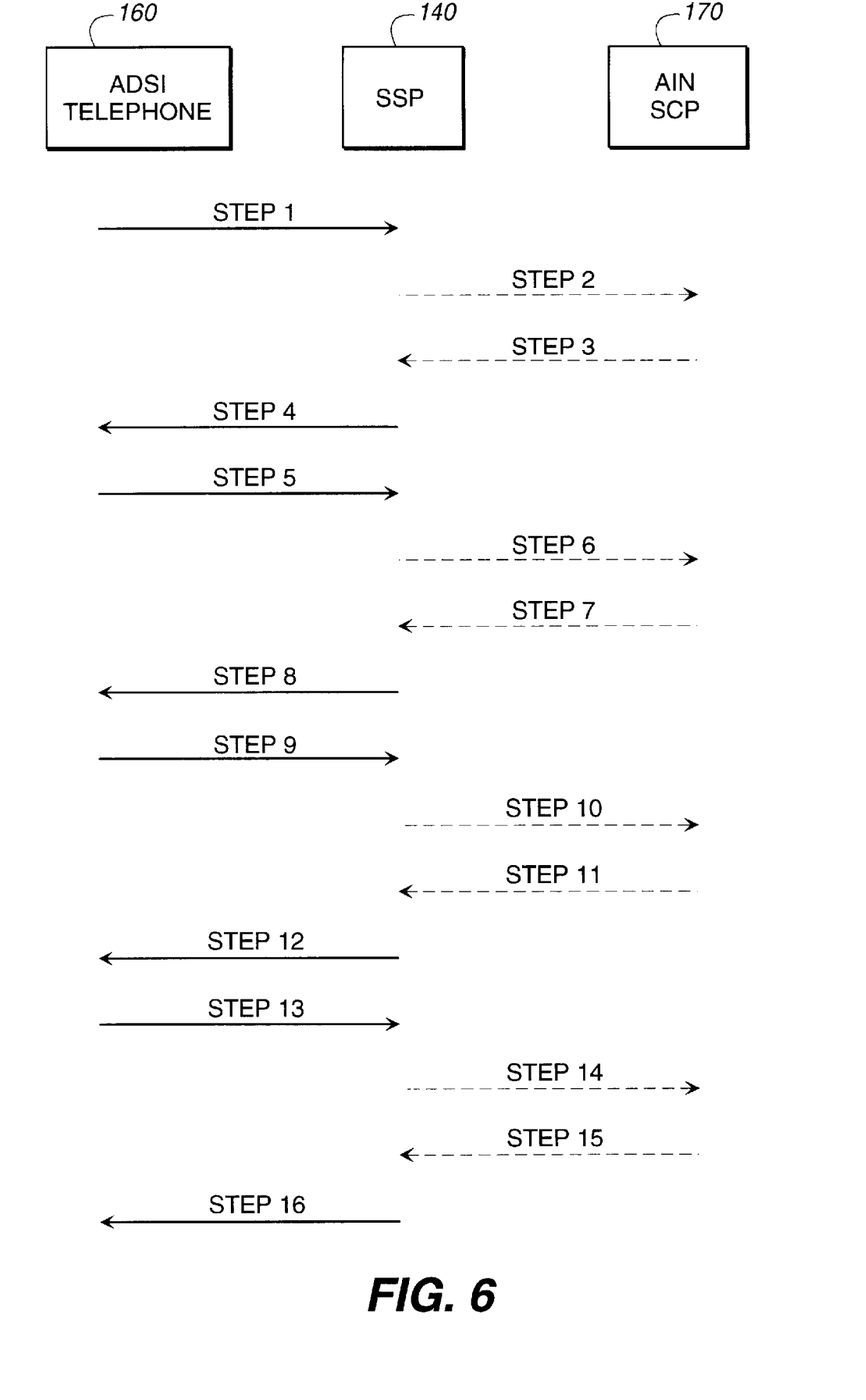
FIG. 6 is a time-line diagram illustrating the operation of an AIN data retrieval and visual display service with a caller ID on call waiting function, in accordance with a second embodiment of this invention, wherein the selected data is sent to a terminating device other than the terminating device used to make the information retrieval request.

According to a second embodiment of the present invention, the information retrieval service could also use the AIN SCP 170 to prompt the caller for a "delivery number" to which the results of the information request would be delivered, rather than being delivered back to the same telecommunications terminating equipment used to initiate the information retrieval service. For example, the caller receives a prompt from the service switching point 140 requesting entry of a delivery number. The caller enters the delivery number of another telecommunications terminating device 162 such as a personal computer or another ADSI compatible telephone. This delivery number would then be communicated to the service switching point 140 which would route the call to the delivery number.

More specifically, as shown in FIG. 6, this second embodiment of the present invention includes steps 1 through 10 of the first embodiment, but then differs in subsequent steps and in that Caller A is calling from a non-ADSI phone 160'. In the second embodiment, after the service switching point 140 sends the third communication in the third query message to the AIN SCP 170, the AIN SCP, in step 11, sends a third response message to the service switching point 140 commanding the service switching point to send a third announcement to Caller A prompting Caller A to specify a delivery number to which the requested data should be sent. In step 12, Caller A enters the delivery number, 404-745-1000, for a personal computer or an ADSI telephone, with the keypad of Caller A's telephone 160', and thereby sends a fourth communication to the service switching point 140. The service switching point 140 receives the fourth communication from Caller A including the delivery number and, in step 13, sends the delivery number via the appropriate signal transfer point 130 to the AIN SCP 170 in a fourth query message.

In response to the fourth query message, the AIN SCP 170, in step 14, searches its database to find the subject telephone number and its associated data as in step 11 of the first embodiment. The AIN SCP 170 determines the value of the data selected by Caller A, retrieves the data, and loads it in the calling party address of a fourth response message and sends the fourth response message to the service switching point 140. If Caller A selected the fax number as the desired data, then the fourth response message from the AIN SCP 170 would have the calling party address 270 populated with the number 704-555-9876 and the called party address 260 populated with the selected delivery number 404-745-1000.

The service switching point 140 receives the fourth response message from the AIN SCP 170 in step 14 and, in step 15, routes the call to the terminating device 162 associated with the delivery number. The call from the service switching point 140 appears as a second incoming call via call waiting on the phone and is displayed to Caller A on the alternate terminating device 162 selected by Caller A.

Embodiment 3: Information Delivery With Multi-Request Queuing

Figure 7:
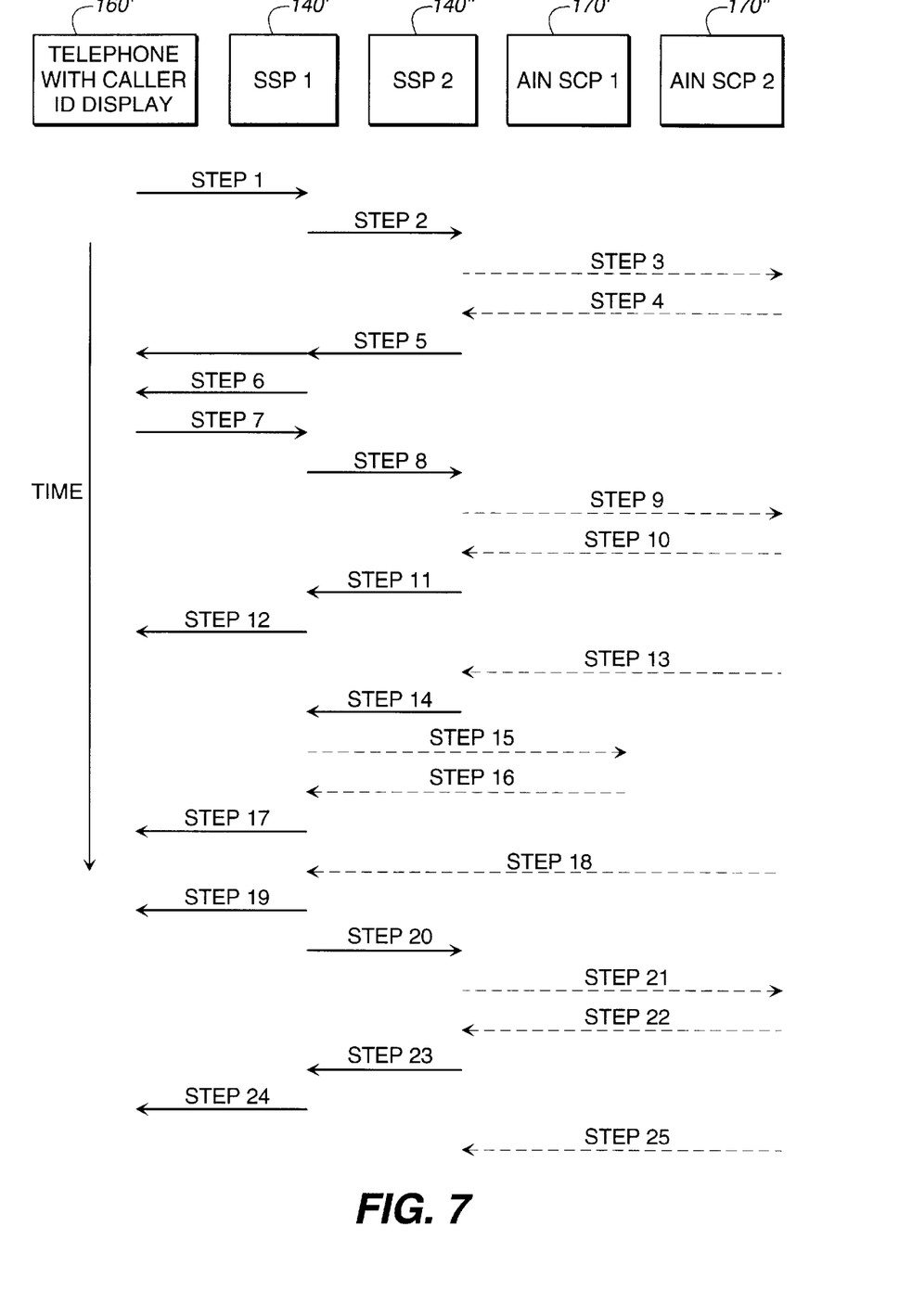
FIG. 7 is a time-line diagram illustrating the operation of an AIN data retrieval and visual display service with a caller ID on call waiting function, in accordance with a third embodiment of this invention, wherein data relating to a plurality of telecommunications subscribers is requested, retrieved and delivered.

According to another embodiment, the AIN SCP 170 can be programmed with AIN software version 0.2 BellCore specification GR-1298-CORE (November 1996) which allows the AIN SCP to create calls to a subscriber such that a series of separate data messages can be sent to the subscriber after only a single request for data retrieval service. For example, the subscriber or caller can request data associated with a series of subject telephone numbers and the AIN SCP 170 will automatically send the data to the caller in a series of separate messages. The AIN SCP 170 creates the calls to the subscriber necessary to send the series of messages containing the data to the subscriber.

FIG. 7 illustrates the third embodiment of the present invention. In step 1, caller A, whose telephone number is 333-1000, initiates a first communication by dialing an information retrieval service number 404-444-1000, to access the information retrieval service provided by the AIN 120 via the PSTN 110. In this third embodiment, caller A makes this first communication from a telephone 160' equipped with a BellCore specification type II Caller ID display box. In addition, the PSTN 110 includes a first service switching point 140' associated with caller A and a second switching point 140" associated with the information retrieval and visual delivery service which is accessible via phone number 444-1000. The AIN 120 in this third embodiment likewise includes a pair of AIN SCPs, 170' and 170". The first AIN SCP 170' is associated with the first service switching point 140' and the second AIN SCP 170" is associated with the second service switching point 140" and the information retrieval and visual delivery service.

In step 2, the first service switching point 140' receives the first communication from caller A including the information retrieval service number and forwards the first communication to the second service switching point 140" associated with the information retrieval service number. The information retrieval service number is assigned a public office dialing plan trigger in the second service switching point 140". This trigger causes an AIN query message to be sent for all calls originating from any caller and dialed to 444-1000. Thus, in step 3, the second service switching point 140" recognizes the number 444-1000 as having the trigger and, in response, launches a first query message to the second AIN SCP 170". In step 3, the calling party address 270 is the telephone number of caller A, 333-1000, and the data field 230 is loaded with a request for information retrieval service.

In response to the second AIN SCP 170" receiving the first query message, the second AIN SCP, which stores the logic for the information retrieval service, conducts step 4 which includes sending a first response message to the second service switching point 140" instructing the second service switching point to send a first announcement to caller A and collect digits. Specifically, the first announcement asks caller A to enter the subject phone numbers associated with the information desired to be retrieved with a delimiter, *x (x is a number from 0–9), between the subject telephone numbers. In steps 5 and 6, respectively, the second service switching point 140" plays the first announcement and delivers the first announcement to caller A through the first service switching point 140'.

In response to the first announcement, caller A, in step 7, enters a series of the subject telephone numbers, associated with the desired information to be retrieved, and separated by the delimiter, *0. For example, caller A enters the following two telephone numbers in series using the keypad of the telephone 160": 666-1000*0777-1000*0. The first number entered by caller A, 666-1000, is associated with telecommunications subscriber Bob and the second number entered by caller A, 777-1000, is associated with telecommunications subscriber Joe. This second communication by caller A is received by the first service switching point 140', is forwarded from the first service switching point to the second service switching point 140" in step 8, and is forwarded from the second service switching point to the second AIN SCP 170" in step 9 as a second query message.

In response to the second query message, the second AIN SCP 170" searches its database to find the requested information and sends a second response message in step 10 instructing the second service switching point 140" to send a second announcement to caller A acknowledging the request for information retrieval service and asking caller A to stay on the line until the first call arrives with the requested information and then hang up the telephone 160'. In subsequent steps 11 and 12, respectively, the second switching point 140" plays the second announcement and passes the second announcement to caller A through the first service switching point 140'.

Following the second response message, the second AIN SCP 170" sends a third response message in step 13 to the second service switching point 140" with the calling party address 270 set to the zip code for telecommunications subscriber Bob, e.g.. 33032*1234, and sets a 25 second timer to create a second call. The timer is set at 25 seconds to allow enough time for the selected information about Bob to be delivered to caller A. In step 14, the second service switching point 140" forwards the call with the requested information regarding Bob to caller A's telephone number at the first service switching point 140'. In step 15, the first service switching point 140' receives a new call from caller A and launches a query message to the first AIN SCP 170' requesting caller ID name delivery. In step 16, the first AIN SCP 170' database returns name=zip code in a response message for display on caller A's caller ID box. Using caller/number delivery on call waiting, the first service switching point 140', in step 17, transmits the response message, including the requested information, to caller A's caller ID display box. On hearing that an incoming call is waiting, caller A looks to see the name "zip code" and number 33032*1234 on caller A's caller ID box and then hangs up the phone.

Meanwhile, in step 18, the create call timer set by the second AIN SCP 170" expires and the second AIN SCP sends a message to the first service switching point 140', using the "create call" command in the AIN SCP program, instructing the first service switching point to place a call from caller A's line to the secondary information retrieval service number 444-1001. Thus, in step 19, the first service switching point places the call from caller A's line using secondary information retrieval service number 444-1001. In response, caller A's phone 160" rings until caller A picks up the line and goes off-hook. Then, in step 20, the first service switching point 140' dials the secondary information retrieval service access number 444-1001 and sends a third communication to the second service switching point 140".

Upon receiving the third communication including the secondary information retrieval service access number, the second service switching point 140", in step 21, sends another query message to the second AIN SCP 170" due to a trigger set on 444-1001. In response, the second AIN SCP 170" recognizes, due to the number called (444-1001), that this is a continuation (queue) request and searches its database for the next entry in a queue list table under caller A's phone number. The second AIN SCP 170" then sends a response message in step 22 instructing the second service switching point 140" to send another announcement to caller A acknowledging the secondary request for information retrieval service and asking caller A to stay on the line until the second call arrives with the requested information and then hang up the telephone 160". In subsequent steps 23 and 24, respectively, the second switching point 140" plays the announcement and passes the announcement to caller A through the first service switching point 140'.

In step 25, the second AIN SCP 170" then sends another response message to the second service switching point 140" addressed to caller A with the calling party address 270 equal to Joe's zip code, 33035*1267. Steps 14–17 are then traversed with Joe's information. Subsequent subject phone numbers entered by caller A can be processed in series in the same manner.

From the foregoing description of the preferred embodiment, it will be appreciated that the present invention encompasses the objects described herein above and overcomes the above-cited drawbacks of the prior art. In view of the foregoing description, other embodiments of the present invention will suggest themselves to those skilled in the art. Therefore, the scope of the present invention is to be limited only by the claims below and equivalents thereof.

We claim:

1. A method for delivering selected data associated with a telephone number in an advanced intelligent network via a public switch telephone network to telecommunications terminating equipment with data receipt and visual display capability, comprising the steps of:

receiving from a caller a first communication including an information retrieval service number;

in response to said first communication, sending a first announcement to the caller prompting the caller to communicate a subject telephone number;

receiving a second communication from the caller including the subject telephone number;

in response to receiving the second communication, retrieving the selected data associated with the subject telephone number from a database;

sending said data in a response message via the public switch telephone network to telecommunications terminating equipment associated with said caller and having data receipt and visual display capability for visual display of said data on said telecommunications terminating equipment.

2. The method of claim 1 wherein the response message is a common channel signal system message including a calling party identification field populated with the selected data.

3. The method of claim 1 wherein the terminating equipment is BellCore specified type II or type III compatible CPE equipment capable of visual data delivery via caller ID on call waiting.

4. The method of claim 1 wherein the terminating equipment is a personal computer.

5. The method of claim 1 wherein the terminating equipment initiates the caller's first communication and receives the response message including the selected data.

6. The method of claim 1 further comprising the steps of sending a second announcement to the caller prompting the caller to select a telephone number corresponding to the telecommunications terminating equipment at which the data is to be received, and receiving the telephone number from the caller corresponding to the telecommunications terminating equipment.

7. The method of claim 1 wherein the selected data includes a facsimile machine number.

8. The method of claim 1 wherein the selected data includes a zip code.

9. The method of claim 1 wherein the selected data includes a 9 digit zip code including a first 5 digits and a last 4 digits and a delimiter between the first 5 digits and the last 4 digits of the zip code.

10. The method of claim 1 wherein the second communication from the caller includes a plurality of subject telephone numbers in series, the step of retrieving the selected data includes retrieving the selected data for the plurality of subject telephone numbers from the database, and the step of sending the selected data includes sending the selected data associated with the subject telephone numbers to the terminating equipment with the advanced intelligent network via the public switch telephone network in a plurality of respective response messages in series.

11. The method of claim 10 further comprising the step of automatically creating, with the advanced intelligent network and the public switch telephone network, a third communication from the caller including a secondary information retrieval service number, after sending a first of said response messages to the terminating equipment and, in response to the third communication, sending a second of said response messages to the terminating equipment.

12. The method of claim 11 wherein the step of creating the third communication includes:

setting a timer in response to receiving the second communication, the timer to expire after sending the first of said response messages;

in response to expiration of the timer, sending a command with the advanced intelligent network to the public switch telephone network to prompt the caller to put the terminating device in off-hook condition;

prompting the caller with the public switch telephone network to put the terminating device in off-hook condition; and in response to the terminating device going off-hook, sending a query message to the advanced intelligent network with the public switch telephone network requesting sending of the second of said response messages.

13. The method of claim 1 wherein the advanced intelligent network includes a service control point and the step of retrieving the selected data from the database is carried out by the advanced intelligent network service control point.

14. The method of claim 13 wherein the step of sending the selected data includes sending the selected data with the advanced intelligent network service control point to the public switch telephone network via the response message and sending the response message to the terminating equipment with the public switch telephone network.

15. The method of claim 1 wherein the step of retrieving data further comprises the steps of sending a third announcement to the caller prompting the caller to communicate the selection of data to be retrieved, and receiving a fourth communication from the caller including the selection of data to be retrieved.

16. A method for delivering selected data associated with a telephone number in an advanced intelligent network via a public switch telephone network to telecommunications terminating equipment with data receipt and visual display capability, the advanced intelligent network including a service control point, the method comprising the steps of:

receiving with the public switch telephone network a first communication from a caller including an information retrieval service number;

in response to receiving said first communication, sending with the public switch telephone network a first query message to the advanced intelligent network service control point including a request for information retrieval service;

in response to the advanced intelligent network service control point receiving the first query message, sending a first response message with the advanced intelligent network service control point to the public switch telephone network commanding the public switch telephone network to send a first announcement to the caller prompting the caller to communicate a subject telephone number;

in response to the first response message, sending with the public switch telephone network the first announcement to the caller;

receiving with the public switch telephone network a second communication from the caller including the subject telephone number;

in response to receiving the second communication with the public switch telephone network, sending the subject telephone number with the public switch telephone network to the advanced intelligent network service control point in a second query message;

in response to receiving the second query message, sending a second response message with the advanced intelligent network service control point to the public switch telephone network commanding the public switch telephone network to send a second announcement to the caller prompting the caller to communicate a selection of data to be retrieved, said data associated with the subject telephone number;

receiving the second response message with the public switch telephone network;

in response to receiving the second response message with the public switch telephone network, sending the second announcement to the caller;

receiving with the public switch telephone network a third communication from the caller including the selection of data to be retrieved;

in response to receiving the third communication with the public switch telephone network, sending a third query message with the public switch telephone network to the advanced intelligent network service control point including the selection of data to be retrieved;

in response to receiving the third query message with the advanced intelligent network service control point, retrieving from a database, with the advanced intelligent network service control point, selected data associated with the subject telephone number;

sending the selected data with the advanced intelligent network service control point via a third response message to the public switch telephone network;

receiving the third response message with the public switch telephone network; and sending with the public switch telephone network the third response message to telecommunications terminating equipment with data receipt and visual display capability associated with said caller for visual display of the selected data on said telecommunications terminating equipment.

17. The method of claim 16 wherein the third response message includes a calling party address field populated with the selected data when the third response message is sent by the advanced intelligent network service control point.

18. The method of claim 16 wherein the terminating equipment is BellCore specified type II or type III compatible CPE equipment capable of visual data delivery via caller ID on call waiting.

19. The method of claim 16 wherein the terminating equipment is a personal computer.

20. The method of claim 16 wherein the terminating equipment initiates the caller's first communication and receives the third response message.

21. The method of claim 16 further comprising the steps of sending a third announcement to the caller prompting the caller to select a telephone number corresponding to the telecommunications terminating equipment at which the data is to be received, and receiving the telephone number from the caller corresponding to the telecommunications terminating equipment.

22. The method of claim 16 wherein the selected data includes a facsimile machine number.

23. The method of claim 16 wherein the selected data includes a zip code.

24. The method of claim 16 wherein the selected data includes a 9 digit zip code including a first 5 digits and a last 4 digits and a delimiter between the first 5 digits and the last 4 digits of the zip code.

25. The method of claim 16 wherein the second communication from the caller includes a plurality of subject telephone numbers in series, the step of retrieving the selected data includes retrieving the selected data for the plurality of subject telephone numbers from the database, and the step of sending the selected data includes sending the selected data associated with the subject telephone numbers to the terminating equipment with the advanced intelligent network via the public switch telephone network in a plurality of respective response messages in series.

26. The method of claim 25 further comprising the step of automatically creating, with the advanced intelligent network and the public switch telephone network, a fourth communication from the caller including a secondary information retrieval service number, after sending a first of said plurality of response messages to the terminating equipment and, in response to the fourth communication, sending a second of said plurality of response messages to the terminating equipment.

27. The method of claim 26 wherein the step of creating the fourth communication includes:

setting a timer in response to receiving the second communication, the timer to expire after sending the first of said plurality of response messages;

in response to expiration of the timer, sending a command with the advanced intelligent network to the public switch telephone network to prompt the caller to put the terminating device in off-hook condition;

prompting the caller with the public switch telephone network to put the terminating device in off-hook condition; and in response to the terminating device going off-hook, sending a query message to the advanced intelligent network with the public switch telephone network requesting sending of the second of said plurality of response messages.

* * * * *